United States Patent [19]

Smirin et al.

[11] 4,331,241
[45] May 25, 1982

[54] APPARATUS FOR THICKNESS SORTING OF SHEET MATERIALS

[76] Inventors: Lev N. Smirin, ulitsa Kosmonavtov, 6, kv. 1; Vladimir P. Kiselev, ulitsa Sadovaya, 13; Vladimir I. Panin, ulitsa Saina, 6, kv. 162; Vladimir I. Terekhin, ulitsa M. Toreza, 43, kv. 62; Alexei A. Valkov, ulitsa Rudneva, 199; Leonid A. Basin, ulitsa Valikhanova, 6, kv. 2; Amangeldy Shortombaev, ulitsa M. Toreza, 34, kv. 64, all of Alma-Ata, U.S.S.R.

[21] Appl. No.: 78,951

[22] Filed: Sep. 26, 1979

[51] Int. Cl.³ .............................................. B07C 5/346
[52] U.S. Cl. .................................... 209/589; 209/576; 250/252; 250/358 R
[58] Field of Search ............... 209/509, 539, 576, 589, 209/903, 588; 250/252, 358 R, 359, 360

[56] References Cited

U.S. PATENT DOCUMENTS

| | | | |
|---|---|---|---|
| 2,742,150 | 4/1956 | Rendel | 209/589 X |
| 2,788,896 | 4/1957 | Coleman | 209/576 |
| 2,981,986 | 5/1961 | Neil | 250/358 X |
| 3,023,900 | 3/1962 | Thier | 209/588 X |
| 3,619,613 | 11/1971 | Chope | 250/359 X |
| 3,782,543 | 1/1974 | Martelli et al. | 209/588 X |
| 3,832,551 | 8/1974 | Bartlett et al. | 250/359 |
| 3,855,467 | 12/1974 | Chope | 250/360 X |
| 4,009,376 | 2/1977 | Faraguet | 250/252 X |
| 4,154,672 | 5/1979 | Wiley et al. | 209/589 |

FOREIGN PATENT DOCUMENTS

| | | | |
|---|---|---|---|
| 1058583 | 2/1967 | United Kingdom . | |
| 1384245 | 2/1975 | United Kingdom | 250/358 |

*Primary Examiner*—David A. Scherbel
*Assistant Examiner*—Edward M. Wacyra
*Attorney, Agent, or Firm*—Steinberg & Raskin

[57] ABSTRACT

A roller conveyer transports sheet material to accumulating hoppers provided with rotatable distributing chutes. Chute drivers are electrically connected to a unit for measuring the material thickness via a control unit. The thickness measuring unit comprises a radioisotope thickness gauge including a radiation detector and a radioactive source, positioned on opposite sides of the sheet material between two pairs of drive rollers of the conveyer. A meter measures the average value of the radiation intensity during a period of time within which a single sample of the material being sorted passes through the radiation zone. Another meter measures the instantaneous value of the radiation intensity.

2 Claims, 5 Drawing Figures

APPARATUS FOR THICKNESS SORTING OF SHEET MATERIALS

BACKGROUND OF THE INVENTION

1. Field of the Invention

The present invention relates to mechanization and automation of production processes. More particularly, the invention relates to apparatus for thickness sorting of sheet material.

The apparatus of the invention is suitable for sorting furs according to the thickness of the leather, before the furs are dressed.

2. Description of the Prior Art

Known apparatus for thickness sorting of a sheet material comprises a belt conveyor for transport of sheet material to accumulating hoppers having distributing plates. The drivers of the distributing plates are electrically connected, via a control unit, to an output of an assembly for measuring the material thickness (cf. USSR Inventor's Certificate No. 103,127; Int.Cl.B07).

The control unit of the known apparatus comprises a reference voltage source and a signal comparison unit in which the signals obtainable from the thickness measuring assembly are compared with reference voltage signals.

The thickness measuring assembly may be implemented, for example, as a radioisotope thickness gauge which comprises a radioactive source and a radiation detector which senses the radiation passing through the material under measurement (cf. Great Britain Patent No. 1,058,583, Int.Cl.G1A).

However, the known apparatus cannot adequately handle sheet materials on which wrinkles are likely to form. This applies, for example, to furs. If there is a wrinkle at a point of measurement, the measurement result is erroneously high and results in improper sorting.

In the known apparatus, the material passes through the measurement area in an untightened or limp condition, and the thickness measuring assembly produces, at the detector output, a signal proportional to a thickness characteristic of a specific point of measurement. It is known, however, that the thickness of the leather of a fur skin changes considerably within a single sample, since dirt and pieces of meat or fat may be encountered. Therefore, with the known apparatus, it is impossible to achieve reliable thickness sorting of a material whose thickness tends to vary along its length.

In addition, the known radioisotope thickness gauge has no zero shift corrector, and therefore should be adjusted by hand, which increases its maintenance requirements.

SUMMARY OF THE INVENTION

An object of the invention is to provide apparatus for thickness sorting of sheet materials, which apparatus provides increased accuracy of measurement.

Another object of the invention is to provide apparatus for thickness sorting of sheet materials, which apparatus includes a unit for measuring the thickness of sheet materials and has an automatic zero drift corrector.

In accordance with the invention, apparatus for thickness sorting of a sheet material comprises a roller conveyor for transporting the material to accumulating hoppers having rotatable distributing chutes. The drivers of the chutes are electrically connected to an input of a unit for measuring the material thickness via a control unit incorporating a reference voltage source and a comparison circuit. The thickness measuring unit comprises, according to the invention, a radioisotope thickness gauge including a radioactive source and a radiation detector positioned on opposite sides of the sheet material between two pairs of drive rollers of the roller conveyor. A meter measures the average value of the radiation intensity during a period of time within which a single sample of the material being sorted passes through the radiation zone. The input of the average radiation intensity meter is coupled to an output of the radiation detector, and its output is coupled to the first three inputs of the comparison circuit. Another meter measures the instantaneous value of the radiation intensity, and its input is coupled to the output of the detector and its output is coupled to the reference voltage source of the control unit and to the fourth input of the comparison circuit.

The instantaneous radiation intensity meter is preferably connected to the reference voltage source via a series arrangement of a switch and a storage element, in order to eliminate an error introduced into the sorting results due to the zero drift of the radioisotope thickness gauge.

The apparatus of the invention has the following advantages.

Since the radioisotope thickness gauge is located between two pairs of drive rollers of the roller conveyor, the wrinkles of the leather of a fur or hide flatten out and the material is passed into the measurement zone in a flattened state. In addition, the thickness of the material is measured along a line, rather than at a single point, which provides greater measurement accuracy and better sorting results.

The instantaneous radiation intensity meter is operated at the moments when no material is available between the radioactive source and the radiation detector. This permits automatic elimination of the zero drift of the gauge and provides better sorting results.

BRIEF DESCRIPTION OF THE DRAWINGS

For a fuller understanding of the invention, reference is had to the following description, taken in connection with the accompanying drawings in which.

DESCRIPTION OF PREFERRED EMBODIMENTS

Figure 1:
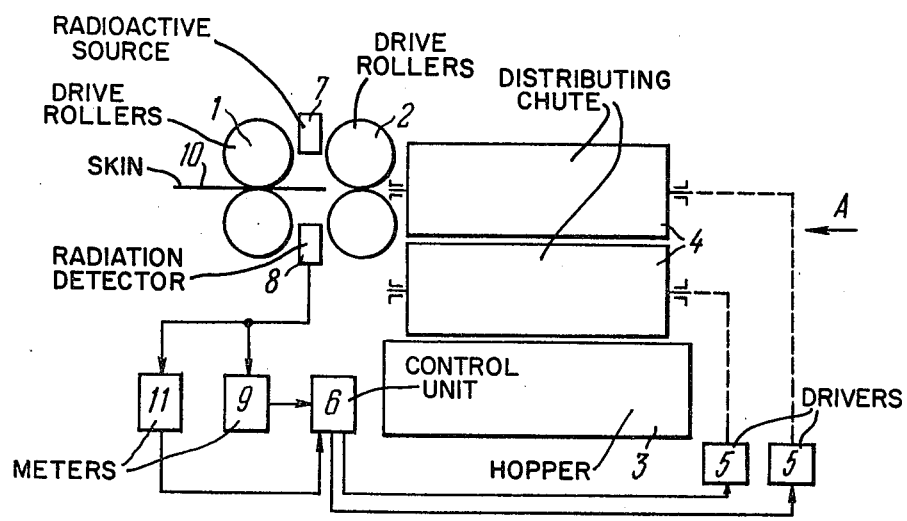
FIG. 1 is a block diagram of an embodiment of the apparatus of the invention for sorting rabbit fur skins in terms of the thickness of their leather.

The apparatus of the invention (FIG. 1) comprises two pairs of drive rollers 1 and 2 of a roller conveyor, and accumulating hoppers 3 having distributing chutes 4 driven by drivers 5. The drivers 5 are electrically connected, via a control unit 6, to a thickness measuring unit. The thickness measuring unit includes a radioactive source 7, a radiation detector 8, a meter 9 for measuring the average value of the radiation intensity during a period of time within which a rabbit fur skin 10 is passed between said radioactive source and said radiation detector through the radiation zone, and a meter 11 for measuring the instantaneous value of the radiation intensity. The source 7 and detector 8 are positioned on opposite sides of the skin 10 between the two pairs 1 and 2 of the drive rollers of the roller conveyer in a manner whereby said rabbit fur skin, driven by the rollers of said pair 1 to said pair 2, is moved perpendicularly to the direction or flow of radiation from said source and intersects said flow. The diameter of the rollers of the pair 2 slightly exceeds that of the rollers of the pair 1. The inputs of the meters 9 and 11 are coupled to an output of the detector 8 and their outputs are coupled to respective inputs of the control unit 6.

Figures 2, 3:
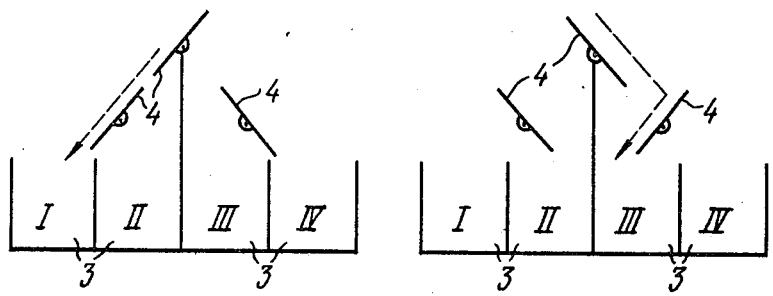
FIG. 2 is a schematic diagram showing the distributing chutes of FIG. 1 in a first position.
FIG. 3 is a schematic diagram showing the distributing chutes of FIG. 1 in a second position.

According to FIGS. 1, 2 and 3, the accumulating hoppers 3 (I,II,III,IV) are located in a single row perpendicular, and are symmetrically positioned with respect, to a plane passing through the axis of the radiation flow from the source 7 perpendicular to the axes of the rollers of the pairs of rollers 1 and 2.

The control unit 6 (FIG. 4) comprises a comparison circuit incorporating comparators 12, 13, 14 and 15 and a logic gate 17, and a reference voltage source 16 producing voltages characteristic of the limit values of the thickness of the leather for the grades of sorting. The reference voltage source 16 is controllable and may comprise, for example, a source repeater, and each of the comparators 12 to 15 includes a reference voltage divider.

Corresponding inputs of the comparators 12, 13 and 14 are coupled to an output of the average radiation intensity meter 9. The input of the comparator 15 is coupled to the output of the meter 11. The remaining corresponding inputs of the comparators are coupled to an output of the reference voltage source 16. The outputs of the comparators 12 to 15 are coupled to inputs of the logic gate 17.

The average radiation intensity meter 9 includes a DC amplifier circuit with a gain factor of 1 and a big input impedance. The output of the meter 9 is connected to an RC circuit having an integration constant of $\tau = (1/3\pi dn)$, wherein l is the length of a section of the sheet material or skin under measurement; d is the diameter of the rollers of the first pair of rollers 1, as viewed in the direction of movement of the skin, and n is the rotary velocity of said rollers in revolutions per second.

The instantaneous radiation intensity meter 11 is an RC circuit connected to the output of the radiation detector 8 and having an integration constant of $\tau_1 \leq (\Delta l / 3\pi dn)$, where $\Delta l$ is the distance between two fur skins following each other on the conveyer.

The output of the meter 11 is coupled to an input of a control subassembly (not shown) of the reference voltage source 16.

Each of the comparators 12, 13, 14 and 15 is an operational amplifier and the logic gate 17 consists of AND-NOT gates connected to form, for example, a coincidence circuit.

Figure 4:
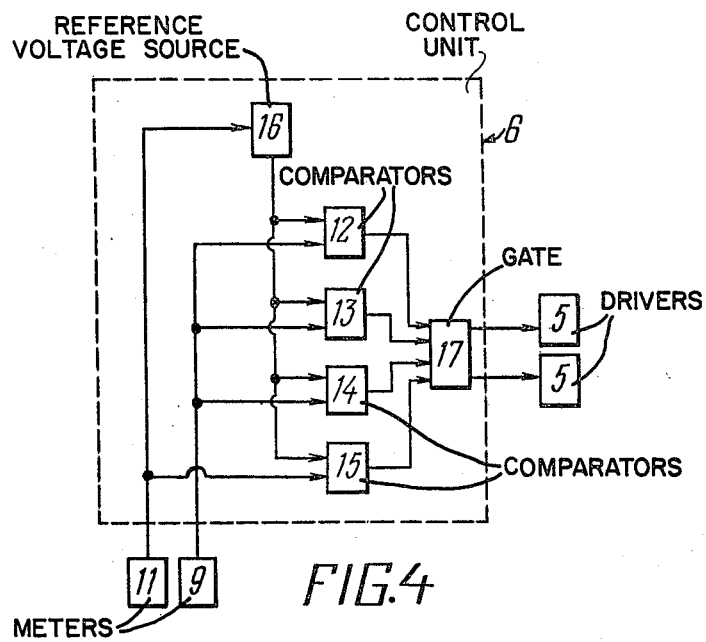
FIG. 4 is a block diagram of an embodiment of the electrical circuit of the apparatus of FIG. 1.
Figure 5:
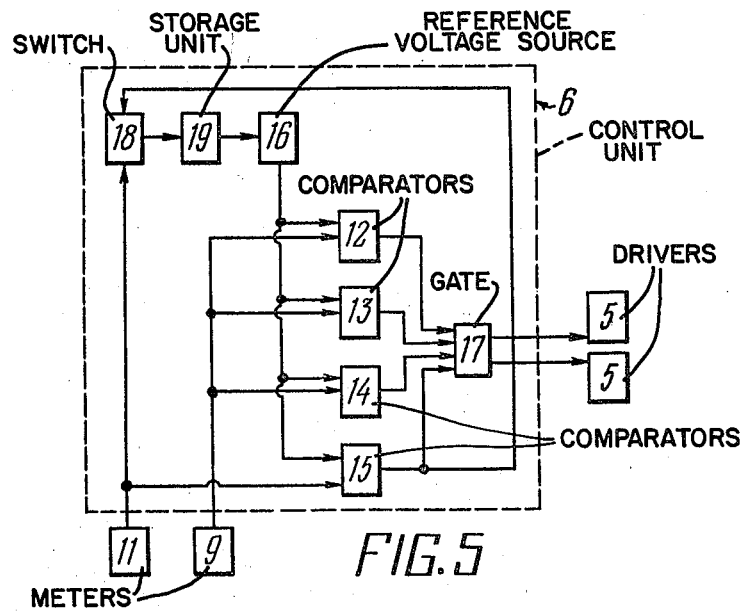
FIG. 5 is a block diagram of a modification of the embodiment of FIG. 4.

FIG. 5 shows a modification of the control unit 6, and is provided with a circuit to eliminate the zero drift of the radioisotope thickness gauge. In this case, the control unit 6 of FIG. 5 differs from the embodiment of said control unit of FIG. 4 by a series arrangement of a switch 18 and a storage unit 19 connected between the output of the meter 11 and the input of the reference voltage source 16. A control input of the switch 18 is coupled to the output of the comparator 15. A reference voltage which is less than the voltage corresponding to the thickness of the thinnest fur skins is applied to the comparator 15.

The switch 18 may be implemented, for example, as an analog switch utilizing field-effect transistors. The storage unit 19 may consist of an RC circuit connected to the input of a DC amplifier having a gain factor of 1 and with a big input impedance.

The apparatus of the invention utilizes a unique relationship between the value of the intensity of the radiation passing through the fur skin under control and the thickness thereof, with such intensity held at a constant level. A voltage produced at the output of the radioisotope thickness gauge is compared with a set of reference voltages representative of the radiation intensities for fur skins whose thicknesses constitute the limits for respective sorting grades.

The apparatus of the invention operates in the following manner. The fur skin 10 is fed to the first pair of rollers 1 and is advanced between the radioactive source 7 and the radiation detector 8 at right angles to the direction or flow of radiation towards the second pair of rollers 2. The rollers of the pairs of rollers 1 and 2 rotate at the same rotary velocity. The somewhat greater diameter of the rollers of the pair 2 results in a tightened state of the fur skin passing between the pairs of rollers. As a result, the wrinkles in the fur skin 10 flatten out. The rollers of the pair of rollers 2 tend to pull the fur skin 10 out of the measurement zone and said skin is then directed into a respective one of the hoppers 3 under the action of the distributing chutes 4.

The control of the position of the distributing chutes 4 is effected via the control unit 6 which controls the drivers 5 as follows. When the fur skin 10 interrupts the flow of radiation between the source 7 and the detector 8, the voltage across the outputs of the meters 9 and 11 drops. The output voltage of the meter 11 is applied to the input of the comparator 15. After a period of time equal to $t = 3\tau$, where $\tau$ is the integration constant of the meter 9, the voltage across the output of said meter reaches a value proportional to the average thickness of the fur skin 10. That voltage is applied to inputs of the comparators 12 to 14 (FIG. 4). The comparators 12 to 15 compare such proportional voltage applied thereto with the reference voltages applied to respective inputs of the comparators from the reference voltage source 16.

Dependent upon the relationship of the voltages applied to the inputs of the comparators 12, 13, 14 and 15, said comparators produce corresponding output signals which are applied to the inputs of the logic gate 17. The gate 17 processes these signals and transmits respective control signals to the drivers 5 of the rotatable distributing chutes 4 (FIGS. 2 and 3). Under the control of these control signals, the chutes 4 assume the required positions at the moment the fur skin 10 leaves the rollers of the pair of rollers 2. The skin 10 slides through the chutes by gravity down to a respective accumulating hopper 3 (I,II,III or IV). In FIGS. 2 and 3, the movement of the fur skin 10 through the chutes 4 is shown by a broken line arrow for two of four possible positions of said chutes.

If the distributing chutes 4 are implemented asymmetrically relative to their axes of rotation, traction electromagnets (not shown in the figures) may be used as the drivers 5. When no current flows through the windings of the electromagnets, the chutes 4 assume a specific position due to the force of gravity. When there is a current flow, the chutes attracted by the electromagnets rotate through a specific angle and assume another position.

When the logic gate 17 (FIG. 4) produces a control signal to deenergize the electromagnets, the chutes 4 (FIGS. 2 and 3) assume a position shown in FIG. 2 and the fur skin 10 drops into the hopper 3-I. When the gate 17 provides a control signal to energize only the electromagnet of the central chute 4, the fur skin 10 drops into the hopper 3-IV. When the gate 17 provides a control signal to energize the side chutes 4, the fur skin 10 drops into the hopper 3-II. When current flows through all the electromagnets, the fur skin 10 drops into the hopper 3-III. The position of the chokes for this case is shown in FIG. 3.

Unstable operation of the radioisotope thickness gauge results from the following causes. The activity of the radioactive source 7 (FIG. 1) decreases in time. The surface of the radiation detector 8 is contaminated. The efficiency of the detector varies, and so on. To compensate for the instability, and therefore provide better sorting results, the meter 11 is operated at the moment when no fur skin is available between the source 7 and the detector 8. If the radiation intensity registered by the meter 11 differs from that at which the reference voltages of the source 16 (FIG. 5) have been determined, they are corrected before application to the comparators 12, 13, 14 and 15. This prevents impairment of the accuracy of sorting.

Unstable operation of the apparatus is corrected, in the absence of the sheet material or skin 10 in the radiation zone, by the circuit of FIG. 5. In FIG. 5, a signal from the meter 11 is applied to the reference voltage source 16. FIG. 5 operates in the following manner. When no fur skin is present between the source 7 and the detector 8, the switch 18 is conducting and the voltage produced by the meter 11 is applied to the storage unit 19 and then to the input of the reference voltage source 16, changing the reference voltage applied from the source 16 to the inputs of the comparators 12, 13, 14 and 15. This provides continuous correction of the reference voltages which are compared with the signals produced by the meters 9 and 11.

When the fur skin 10 appears between the radioactive source 7 and the radiation detector 8 (FIG. 1), the voltage across the output of the comparator 15 (FIG. 5) is reversed and the switch 18 is made non-conducting. The storage unit 19 stores data at the level of the signal from the meter 11 until the moment the switch 18 becomes conductive.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. Apparatus for thickness sorting of sheet materials, said apparatus comprising
accumulating hoppers equal in number to sorting grades for sheet material, said hoppers having inlets;
rotatable distributing chutes positioned at the inlets of said hoppers;
a roller conveyor for transporting sheet material to said hoppers, said roller conveyor having at least two pairs of drive rollers spaced from each other for feeding the sheet material from one pair of the other, each of the rollers having an axis;
a radioactive source positioned on one side of said sheet material between the two pairs of rollers for producing radiation in an axis directed substantially perpendicular to said sheet material through said material;
a radiation detector positioned on the opposite side of said sheet material between said two pairs of rollers and substantially perpendicular to said sheet material for receiving radiation from said radioactive source passing through said sheet material and thereby forming a radiation zone, said detector having an output, said hoppers being positioned in a row perpendicular to, and symmetrical with, a plane passing through the axis of radiation and perpendicular to the axes of said pairs of rollers;
an average radiation intensity meter for measuring the average value of the radiation intensity during a period of time not longer than the time within which a single sample of said sheet material passes through the radiation zone, said average radiation intensity meter having an input electrically connected to the output of said detector, and an output;
an instantaneous radiation intensity meter for measuring the instantaneous value of the incident radiation intensity in the absence of said sheet materials, said instantaneous radiation intensity meter having an input electrically connected to the output of said detector, and an output;
a reference voltage source having an input electrically coupled to the output of said instantaneous radiation intensity meter, and an output;
a comparison circuit for comparing a reference voltage with voltages corresponding to the intensity of radiation passing through said sheet material, said comparison circuit having a first plurality of inputs equal in number to the sorting grades for said sheet material and electrically connected to the output of said reference voltage source and a second plurality of inputs equal in number to the first plurality of inputs, one of the second plurality of inputs being electrically connected to the output of said instantaneous radiation intensity meter and the others of said second plurality of inputs being electrically connected to said average radiation intensity meter, said comparison circuit having a plurality of outputs;
drivers coupled to said chutes for rotating said chutes; and
coupling means electrically coupling said drivers to the outputs of said comparison circuit whereby said drivers are energized and rotate said chutes in accordance with the results of the comparing of voltages of said comparison circuit.

2. Apparatus as claimed in claim 1, further comprising a switch having a first input electrically connected to the output of said instantaneous radiation intensity meter, a second input electrically connected to an output of said comparison circuit providing information indicating changes in the level of a signal at the output of said instantaneous radiation intensity meter, and an output, and a storage unit having an input electrically connected to the output of said switch and an output electrically connected to the input of said reference voltage source.

* * * * *